US006789414B2

(12) United States Patent
Fuwa

(10) Patent No.: US 6,789,414 B2
(45) Date of Patent: Sep. 14, 2004

(54) ESTIMATION APPARATUS OF AIR INTAKE FLOW FOR INTERNAL COMBUSTION ENGINE AND ESTIMATION METHOD THEREOF

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/665,146

(22) Filed: Sep. 22, 2003

(65) Prior Publication Data

US 2004/0079341 A1 Apr. 29, 2004

(30) Foreign Application Priority Data

Oct. 23, 2002 (JP) ....................................... 2002-308630

(51) Int. Cl.[7] ......................... G01M 15/00; G01L 23/24
(52) U.S. Cl. ....................................... 73/118.2; 123/488
(58) Field of Search .......................... 73/118.2; 123/488

(56) References Cited

U.S. PATENT DOCUMENTS 6,640,622 B2 * 11/2003 Soliman et al. ............ 73/118.2
6,659,095 B2 * 12/2003 Kotwicki et al. .......... 73/118.2
6,718,822 B2 * 4/2004 Soliman et al. ............ 73/118.2
2001/0013335 A1 8/2001 Hosokawa et al.
2002/0078924 A1 6/2002 Yagi
2002/0107630 A1 * 8/2002 Yagi .......................... 73/118.2
2002/0129790 A1 9/2002 Kowatari et al.
2002/0133286 A1 * 9/2002 Kolmanovsky et al. .... 73/118.2
2002/0179050 A1 * 12/2002 Soliman et al. ............ 73/118.2
2003/0046991 A1 * 3/2003 Masson et al. ............ 73/118.2

FOREIGN PATENT DOCUMENTS

| | | |
|---|---|---|
| JP | A 2-108834 | 4/1990 |
| JP | A 4-12148 | 1/1992 |
| JP | A 7-189786 | 7/1995 |
| JP | A 10-227245 | 8/1998 |
| JP | A 10-274079 | 10/1998 |
| JP | A 2002-70633 | 3/2002 |

* cited by examiner

*Primary Examiner*—Erick Solis
(74) *Attorney, Agent, or Firm*—Oliff & Berridge, PLC

(57) ABSTRACT

In an estimation apparatus of an air intake flow for an internal combustion engine, an air intake flow rate fed into a portion just upstream of an intake valve at a predetermined timing before starting of fuel injection is calculated based on an output of an air flow meter. A variance in the air intake flow rate caused by the change in the intake pressure at the portion just upstream of the intake vale at the predetermined timing is calculated based on an output of a pressure sensor. The calculated air intake flow rate is added to the variance to obtain an air intake flow rate fed into a cylinder at the predetermined timing. The air intake flow rate fed into the cylinder is corrected to an air intake flow rate required for estimating an actual air intake flow based on an amount of change in the air intake flow rate fed into the cylinder at the predetermined timing.

16 Claims, 4 Drawing Sheets

ESTIMATION APPARATUS OF AIR INTAKE FLOW FOR INTERNAL COMBUSTION ENGINE AND ESTIMATION METHOD THEREOF

The disclosure of Japanese Patent Application No.2002-308630 filed on Oct. 23, 2002 including the specification, drawings and abstract are incorporated herein by reference in its entirety.

BACKGROUND OF THE INVENTION

1. Field of Invention

The invention relates to an estimation apparatus of an air intake flow for an internal combustion engine.

2. Description of Related Art

An appropriate control of a combustion air/fuel ratio requires accurate estimation of an air intake flow fed into the cylinder. Generally an air flow meter disposed upstream of a throttle valve has been used to detect the air intake flow, or a pressure sensor disposed downstream of the throttle valve has been used such that the air intake flow is derived from the detected pressure of an intake pipe. Each of the aforementioned sensors, however, fails to provide the accurate air intake flow independently. Accordingly, there has been proposed to combine different kinds of the aforementioned sensors so as to obtain the accurate air intake flow.

For example, a change ΔGin in the air intake flow rate fed into the intake pipe is calculated based on a variance in the pressure of the intake pipe downstream of the throttle valve, which is detected by the pressure sensor. Then the calculated change ΔGin is added to an air intake flow rate Gafm detected by the air flow meter to obtain an air intake flow rate Ge currently fed into the cylinder. Considering the response delays of both the air flow meter and the pressure sensor, there has been proposed for correcting the air intake flow rate Gafm and the change ΔGin to values in order to compensate such delays using the respective time constants (see Related Art No. 1). Other documents as related art of the invention will be listed below:

Related Art No. 1: JP-A-2002-70633 (paragraphs [0022] to [0032]);

Related Art No. 2: JP-A-7-189786;

Related Art No. 3: JP-A-10-227245;

Related Art No. 4: JP-A-10-274079;

Related Art No. 5: JP-A-4-12148; and

Related Art No. 6: JP-A-2-108834.

The actual air intake flow fed into the cylinder is defined by the air intake flow rate at an intake valve closing timing. The timing for calculating the air intake flow rate, however, is required to be at least prior to the timing for starting the fuel injection, i.e., far before the intake valve closing timing. In a normal state of the internal combustion engine, the calculated air intake flow rate is substantially in accord with the actual air intake flow rate at the intake valve closing timing. Accordingly, the estimated air intake flow is relatively accurate. Meanwhile in a transient state of the internal combustion engine, there may be a clear difference between the calculated air intake flow rate and the actual air intake flow rate at the intake valve closing timing. In this case, the actual air intake flow cannot be estimated accurately.

SUMMARY OF THE INVENTION

It is an object of the invention to provide an estimation apparatus of an air intake flow for an internal combustion engine, which is capable of accurately estimating the air intake flow fed into the cylinder.

An estimation apparatus of an air intake flow for an internal combustion engine includes a pressure sensor that detects an intake pressure in a portion just upstream of an intake valve of an intake system of the internal combustion engine and an air flow meter that detects an air intake flow rate fed from an upstream side of the intake system to the portion just upstream of the intake valve. In the estimation apparatus, a first air intake flow rate fed into the portion just upstream of the intake valve at a predetermined timing prior to a timing for starting fuel injection is obtained based on an output of the air flow meter, a variance in an air intake flow rate caused by a change in the intake pressure in the portion just upstream of the intake valve is obtained based on an output of the pressure sensor, a second air intake flow rate fed into a cylinder of the internal combustion engine at the predetermined timing is obtained by adding the first air intake flow rate to the variance in the air intake flow rate. Then the second air intake flow rate fed into the cylinder is corrected to a third air intake flow rate required for estimating an actual air intake flow based on an amount of change in the second air intake flow rate fed into the cylinder at the predetermined timing.

An estimation apparatus of an air intake flow for an internal combustion engine includes a pressure sensor that detects an intake pressure in a portion just upstream of an intake valve of an intake system of the internal combustion engine and an air flow meter that detects an air intake flow rate fed from an upstream side of the intake system to the portion just upstream of the intake valve. In the estimation apparatus, a first air intake flow rate fed into the portion just upstream of the intake valve at a predetermined timing prior to a timing for starting fuel injection is obtained based on an output of the air flow meter, a variance in an air intake flow rate caused by a change in the intake pressure in the portion just upstream of the intake valve is obtained based on an output of the pressure sensor, a second air intake flow rate fed into a cylinder of the internal combustion engine at the predetermined timing is obtained by adding the first air intake flow rate to the variance in the air intake flow rate. Then the second air intake flow rate fed into the cylinder is corrected to a third air intake flow rate required for estimating an actual air intake flow based on an amount of change in a state of a mechanism of the internal combustion engine at the predetermined timing, the mechanism giving an influence on the air intake flow.

In the estimation apparatus, a state of the mechanism that gives an influence on an actual air intake flow is estimated based on an amount of change in a state of the mechanism at the predetermined timing, a difference between an air intake flow rate estimated based on the estimated state of the mechanism and an intake air flow rate fed into the cylinder at the predetermined timing that is estimated based on the estimated state of the mechanism at the predetermined timing is calculated. The calculated difference is added to the second air intake flow rate so as to be corrected to a third air intake flow rate required for estimating the actual air intake flow such that an air intake flow fed into the cylinder is estimated.

DETAILED DESCRIPTION OF PREFERRED EMBODIMENTS

Figure 1:
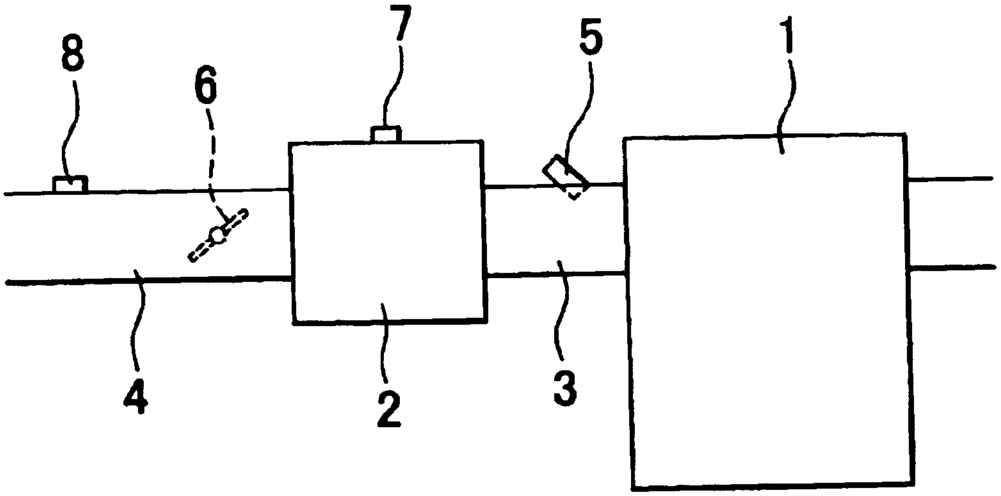
FIG. 1 is a schematic view of an internal combustion engine on which an estimation apparatus of air intake flow of the invention is mounted.

FIG. 1 is a schematic view of an internal combustion engine on which an estimation apparatus of an air intake flow of the invention is mounted. FIG. 1 schematically shows an internal combustion engine 1 and a surge tank 2 communicated with the respective cylinders of the engine 1. An intake pipe 3 serves to communicate between the surge tank 2 and the respective cylinders, and an intake passΔGe 4 locates upstream of the surge tank 2. A fuel injection valve 5 is provided in each of the intake pipes 3, respectively, and a throttle valve 6 is disposed just upstream of the surge tank 2 in the intake passΔGe 4. The throttle valve 6 is not structured to be operated accompanied with an accelerator pedal but allowed to set its opening degree freely by a driving device such as a stepper motor. A pressure sensor 7 is disposed on the surge tank 2 to detect the intake pressure within the surge tank 2. An air flow meter 8 is disposed on the intake passΔGe 4 to detect the air intake flow rate at a portion upstream of the throttle valve 6 in the intake passΔGe 4.

Figure 2:
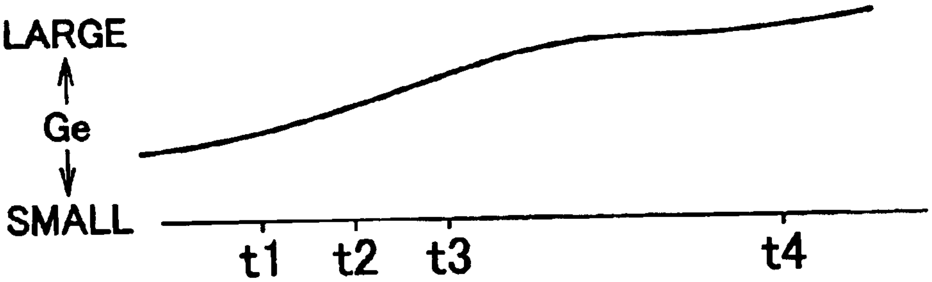
FIG. 2 is a timing chart representing changes in the air intake flow rate in the transient state of the internal combustion engine.

In order to control the combustion air/fuel ratio in the internal combustion engine 1 to a desired value, for example, a theoretical air/fuel ratio, it is necessary to accurately estimate the air intake flow fed into the cylinder in consideration with the transient state of the engine 1. FIG. 2 is a timing chart representing the air intake flow rate Ge fed into the cylinder in the transient state of the internal combustion engine 1. Referring to FIG. 2, at a time point t3, the intake valve opens, and at a time point t4, the intake valve closes. The fuel injection valve 5 is operated to start the fuel injection at a time point t2 prior to the intake valve opening timing. Quantity of the injected fuel, thus, has to be determined prior to the time point t2 at which the fuel injection starts. Therefore, the quantity of the injected fuel has to be determined for realizing the desired air/fuel ratio by estimating the air intake flow fed into the cylinder at a time point t1.

An air intake flow rate Gafm flowing in a portion downstream of the throttle valve 6, that is, just upstream of the intake valve in the intake system at the t1 is calculated based on an output of the air flow meter 8 for estimating the air intake flow at the t1. It is preferable to correct the output of the air flow meter 8 at the t1 with the time constant so as to compensate the response delay of the air flow meter 8.

Then the variance ΔGe in the air intake flow rate in the portion just upstream of the intake valve at the t1 is calculated based on an output of the pressure sensor 7 using the following equation:

$$\Delta Ge=(P1-P2)/t*V/RT$$

where P1 represents the pressure within the surge tank 2 just before the time point t1, P2 represents the pressure within the surge tank 2 at the time point t1, t represents the time period for which the pressure within the surge tank 2 changes from P1 to P2, V represents the capacity of the portion just upstream of the intake valve, that is, the total capacity of the surge tank 2 and the intake pipe 3, R represents gas constant, and T represents the temperature within the portion just upstream of the intake valve on the assumption that no temperature change occurs.

The variance ΔGe corresponds with a part of the air intake flow rate fed toward upstream of the intake valve, which causes the change in the pressure thereof. If the pressure in the portion just upstream of the intake valve increases (P1<P2), the variance ΔGe takes a negative value. If such pressure decreases (P1>P2), the variance AG2 takes a positive value.

It is preferable to calculate the pressure P2 by correcting the output of the pressure sensor 7 at the t1 with the time constant so as to compensate the response delay. Also it is preferable to calculate the pressure P1 by correcting the output of the pressure sensor 7 at a timing just before the t1 with the time constant so as to compensate the response delay.

The air intake flow rate fed into the portion just upstream of the intake valve at the t1 is added to the variance ΔGe in the air intake flow rate so as to obtain the air intake flow rate Ge fed into the cylinder at the t1.

In the normal state of the engine, the air intake flow rate fed into the cylinder at the t1 is substantially the same as the one fed into the cylinder at the t4. Accordingly, it is possible to estimate the air intake flow based on the air intake flow rate at the t1 with no problem. In the transient state of the engine, however, the air intake flow rate at the t1 is clearly different from the one at the t4 that greatly influences the actual air intake flow as shown in FIG. 2. Therefore, the air intake flow estimated based on the air intake flow rate at the t1 prior to the start of fuel injection has no accuracy. Accordingly, the fuel injection quantity determined based on the aforementioned air intake flow may fail to realize the desired air/fuel ratio.

Figure 3:
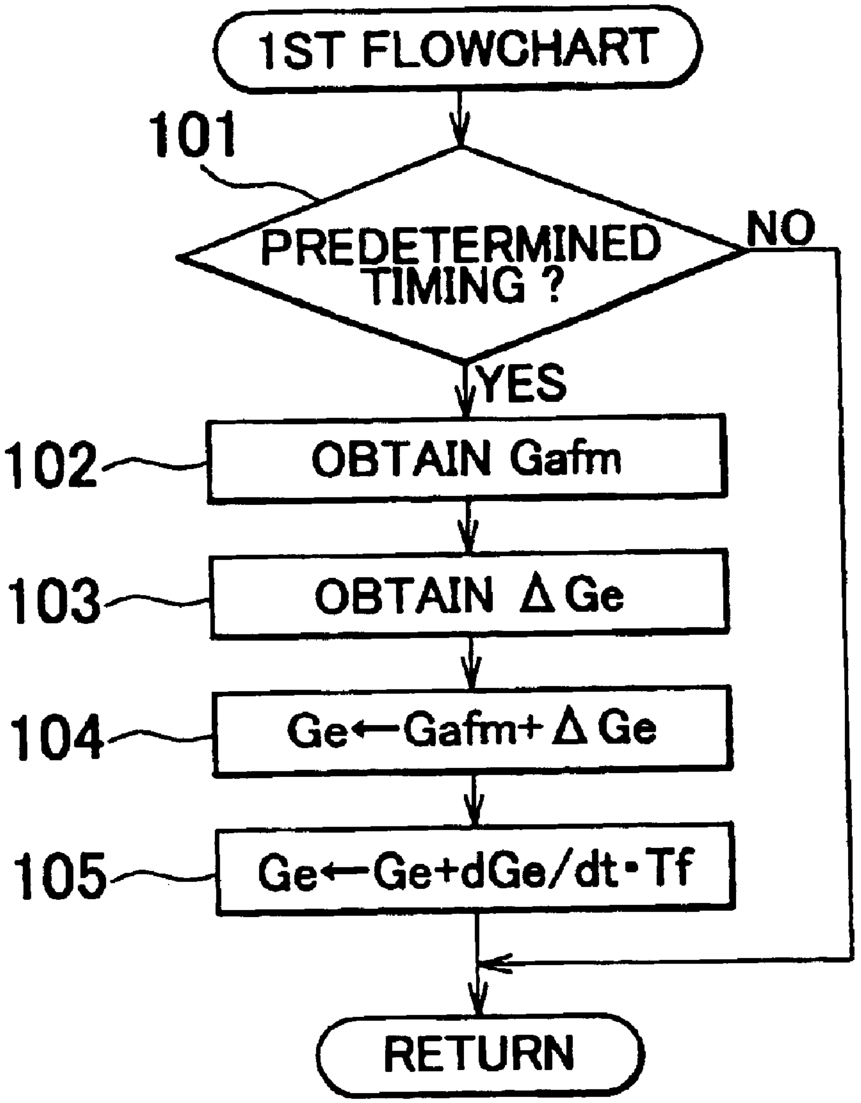
FIG. 3 is a first flowchart of the control routine for obtaining the air intake flow rate.

Referring to a first flowchart of FIG. 3, the air intake flow rate at the t1 is corrected to the air intake flow rate at the t4 as the value required for estimating the actual air intake flow. First in step 101, it is determined whether the time has reached the time point t1 as the predetermined timing for estimating the air intake flow. If NO is obtained in step 101, the control routine of the first flowchart ends. If YES is obtained in step 101, the process proceeds to step 102 where the air intake flow rate Gafm fed into the portion just upstream of the intake valve at the t1 is calculated based on the output of the air flow meter 8. Then in step 103, the variance ΔGe in the air intake flow rate at the portion just upstream of the intake valve at the t1 is calculated based on the output of the pressure sensor 7.

In step 104, the variance ΔGe is added to the air intake flow rate Gafm to obtain an air intake flow rate Ge fed into the cylinder at the t1. Then in step 105, a ratio of change in the air intake flow rate Ge at the t1, that is, dGe/dt is multiplied by the time Tf taken from the time points t1 to t4 to obtain an amount of change in the air intake flow rate at the t4. The resultant amount of change is added to the air intake flow rate Ge at the t1 to obtain an estimated value of the air intake flow rate at the time point t4.

The raito of change at the t1 dGe/dt may be obtained by calculating the air intake flow rate Ge' at a time point t1' just before the time point t1 through the equation of (Ge−Ge')/(t1−t1'). In the first flowchart, the air intake flow rate at the t1 is corrected to the one at the t4 on the assumption that the air intake flow rate varies from the time points t1 to t4 at the ratio of change calculated at the time point t1.

Figure 4:
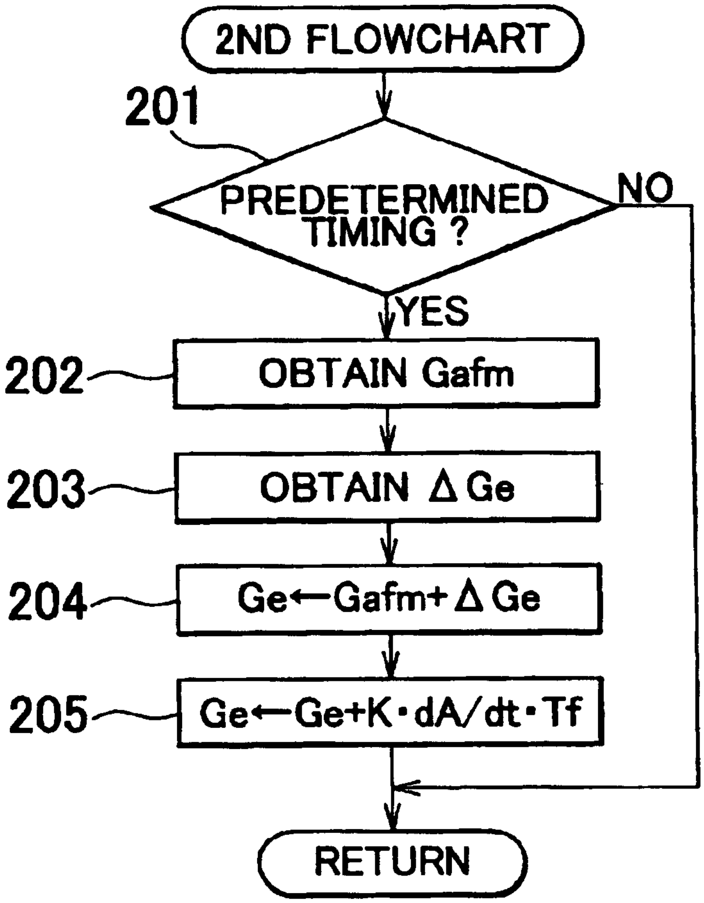
FIG. 4 is a second flowchart of the control routine for obtaining the air intake flow rate.

The air intake flow rate calculated at the t1 may be corrected to the air intake flow rate at the t4 in a control routine of a second flowchart shown in FIG. 4. Steps from 201 to 204 of the second flowchart are the same as those of the first flowchart. The explanation of those steps, thus, will be omitted. In step 205, the ratio of change in a depression amount A of an accelerator pedal at the t1, that is, dA/dt is multiplied by a predetermined coefficient K and the time Tf taken from the t1 to t4 so as to obtain the amount of change in the air intake flow rate at the t4. The obtained amount of change is added to the air intake flow rate Ge at the t1 such that the estimated value of the air intake flow rate at the t4 is obtained.

The change ratio of the depression amount A of the accelerator pedal at the t1 may be obtained by the equation (A−A')/(t1−t1') where A represents the actual measurement of the depression amount of the accelerator pedal at the t1, and A' represents the actual measurement of the depression amount of the accelerator pedal at a time point t1'just before the time point t1. Upon depression of the accelerator pedal, the opening degree of the throttle valve 6 is changed such that the air intake flow rate varies. The accelerator pedal, thus, gives an influence on the air intake flow. Accordingly, the amount of change in the air intake flow rate per unit of time may be obtained by multiplying an appropriate coefficient K by the change ratio dA/dt of the depression amount A of the accelerator pedal, i.e., the amount of change in a state of the accelerator pedal. The amount of change in the air intake flow rate from the t1 to t4 may be obtained by multiplying the amount of change by the Tf taken from the t1 to t4. The resultant amount of change is added to the air intake flow rate Ge at the t1 such that the air intake flow rate at the t1 is corrected to the one at the t4.

The operation of the throttle valve itself may influence the air intake flow. Therefore the air intake flow may be corrected based on the amount of change in the state of the throttle valve instead of the change in the state of the accelerator pedal. In this case, the amount of change in the air intake flow rate per unit of time may be calculated by multiplying a predetermined coefficient by the change ratio of the opening degree of the throttle valve at the t1, that is, the amount of change in the state of the throttle valve, which may be obtained based on the opening degree of the throttle valve that has been measured at the time points t1 and t1' by a throttle sensor. The predetermined coefficient herein is different from the predetermined coefficient K to be multiplied by the amount of change in the state of the accelerator pedal.

The maximum lift amount of the intake valve, or the maximum lift amount and the intake valve opening period may be adjusted to control the air intake flow. In this case, a variable valve system for controlling the air intake flow may give an influence on the air intake flow. In this case, the amount of change in the air intake flow per unit of time may be obtained by multiplying a predetermined coefficient by an amount of change in a position of the variable valve system at the t1, that is, the amount of change in the state of the variable valve system, which is obtained based on the position of the variable valve system measured at the time points t1 and t1'. The position of the variable valve system corresponds with the maximum lift amount of the intake valve. In this case, however, the air intake flow rate required for estimating the actual air intake flow is governed by the maximum lift amount of the intake valve. Accordingly the time Tf used for correcting the air intake flow rate at the t1 corresponds with the timing for which the lifting amount of the intake valve becomes maximum, that is, the time taken until an intermediate point between the intake valve opening timing and the intake valve closing timing rather than the time taken until the intake valve closing timing. The predetermined coefficient is different from those to be multiplied by the amounts of change in the state of the accelerator pedal or the throttle valve. When the intake valve opening period is controlled, the intake valve closing timing is changed. Then the time Tf used for correcting the air intake flow rate at the t1 changes accordingly. When the intake valve opening period is only adjusted for controlling the air intake flow, the air intake flow rate at the t1 is substantially the same as the air intake flow rate at the t4. Therefore, the air intake flow rate at the t1 does not have to be corrected.

Figure 5:
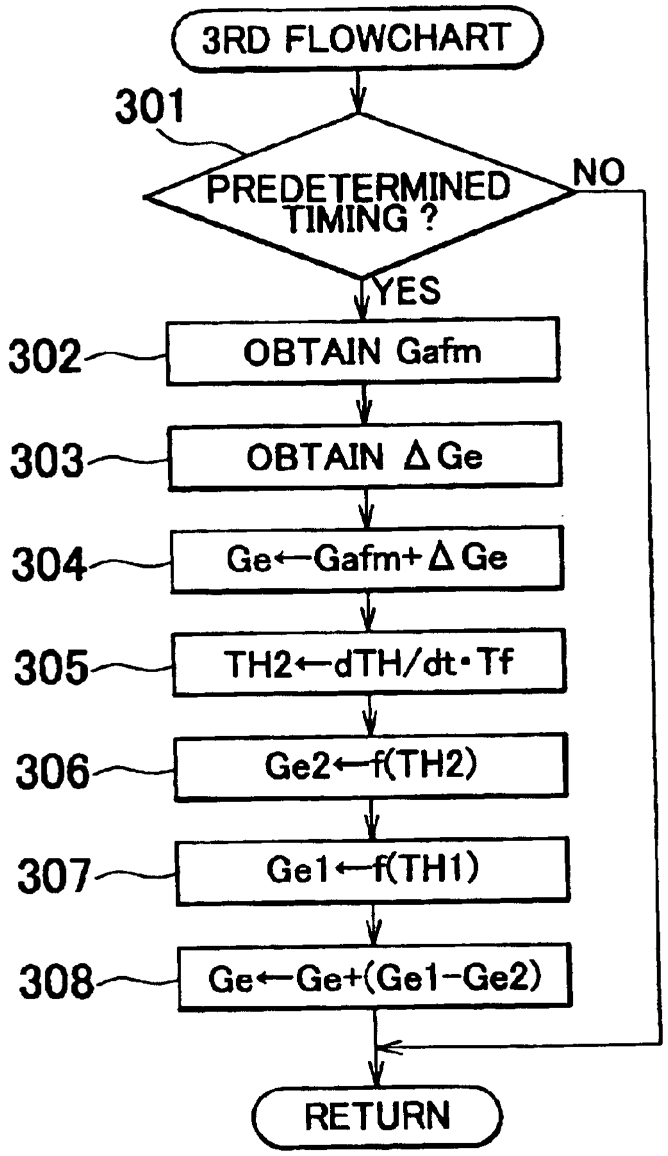
FIG. 5 is a third flowchart of the control routine for obtaining the air intake flow rate.

The air intake flow rate at the t1 may be corrected to the one at the t4 in accordance with a control routine in a third flowchart shown in FIG. 5. As steps 301 to 304 in the third flowchart are the same as steps 101 to 104 of the first flowchart, the description of those steps, thus, will be omitted. In step 305 of the third flowchart, the change ratio of the opening degree TH of the throttle valve 6 at the t 1, that is, dTH/dt is multiplied by the time Tf taken from the t1 to t4 so as to calculate the opening degree TH2 of the throttle valve 6 at the t4. The change ratio dTH/dt of the opening degree TH of the throttle valve 6 at the t1 may be calculated using the equation (TH−TH')/(t1−t1') where TH' represents the opening degree of the throttle valve 6 at the time point t1' just before the time point t1.

In step 306, an intake flow rate Ge2 fed into the cylinder at the t4 is estimated based on the opening degree TH2 of the throttle valve 6, considering the engine speed and the like. In step 307, an air intake flow rate Ge1 fed into the cylinder at the t1 is estimated based on the opening degree TH1 of the throttle valve 6 at the t1, considering the engine speed and the like. The estimated air intake flow rates Ge2 and Ge1 may be correlated with the throttle valve opening and the engine speed, and stored in the form of a map.

In step 308, an amount of change in the air intake flow rate (Ge2−Ge1) from the t1 to t4 based on the opening degree of the throttle valve 6 is added to the air intake flow rate Ge at the t1 such that the air intake flow rate at the t1 is corrected to the one at the t4. The air intake flow rate obtained based on the opening degree of the throttle valve cannot be considered as being accurate. However, the difference between two values of the above-described air intake flow rates is relatively accurate. Accordingly it is possible to accurately correct the air intake flow rate Ge at the t1 as the accurate value derived from outputs of the air flow meter and the pressure sensor to the air intake flow rate at the t4 based on the aforementioned difference.

In the case where the air intake flow is controlled in accordance with the maximum lift amount of the intake valve, there is a difference between the maximum lift amount of the intake valve in the cylinder that is brought into an intake stroke at the t1 for calculating the air intake flow and the maximum lift amount of the intake valve in the other cylinder in the transient state of the engine. In this case, the amount of change in the position of the variable valve system at the t1 is multiplied by the time taken from the t1 to the time point at which the lifting amount of the intake valve becomes maximum to obtain the position of the variable valve system at the time point required for estimating the actual air intake flow. The air intake flow rate Ge2 fed into the cylinder is estimated based on the maximum lift amount of the intake valve corresponding to the position of the variable valve system considering the engine speed and the like. Then the air intake flow rate Ge1 fed into the cylinder at the t1 is estimated based on the maximum lift amount of the intake valve corresponding to the position of the variable valve system at the t1 considering the engine speed and the like. Those estimated intake flow rates Ge2 and Ge1 may be correlated with the position of the variable valve system or the maximum lift amount of the intake valve and the engine speed, and stored in the form of a map.

The amount of change in the air intake flow rate (Ge2−Ge1) based on the maximum lift amount of the intake valve corresponding to the position of the variable valve system is added to the air intake flow rate Ge at the t1. Accordingly the air intake flow rate at the t1 is corrected to the one required to estimate the actual air intake flow. In the case where the opening degree of the throttle valve is adjusted in addition to the maximum lift amount of the intake valve for controlling the air intake flow, the air intake flow rate Ge1 at the t1 is estimated based on the maximum lift amount of the intake valve corresponding to the position of the variable valve system at the t1, and the opening degree of the throttle valve. Then the air intake flow rate Ge2 at the maximum lift timing of the intake valve is estimated based on the maximum lift amount of the intake valve corresponding to the position of the variable valve system at the maximum lift timing of the intake valve and the opening degree of the throttle valve. The opening degree of the throttle valve at the respective time points may be estimated as aforementioned referring to the third flowchart.

In an estimation apparatus of an air intake flow for an internal combustion engine, a first air intake flow rate fed into the portion just upstream of the intake valve at a predetermined timing prior to a timing for starting fuel injection is obtained based on an output of the air flow meter, a variance in an air intake flow rate caused by a change in the intake pressure in the portion just upstream of the intake valve is obtained based on an output of the pressure sensor, a second air intake flow rate fed into a cylinder of the internal combustion engine at the predetermined timing is obtained by adding the first air intake flow rate to the variance in the air intake flow rate. The second air intake flow rate fed into the cylinder is then corrected to a third air intake flow rate required for estimating an actual air intake flow based on an amount of change in the second air intake flow rate fed into the cylinder at the predetermined timing. Accordingly the air intake flow rate that greatly influences the air intake flow actually fed into the cylinder is calculated at the predetermined timing. This makes it possible to accurately estimate the air intake flow fed into the cylinder.

In an estimation apparatus of an air intake flow for an internal combustion engine, a first air intake flow rate fed into the portion just upstream of the intake valve at a predetermined timing prior to a timing for starting fuel injection is obtained based on an output of the air flow meter, a variance in an air intake flow rate caused by a change in the intake pressure in the portion just upstream of the intake valve is obtained based on an output of the pressure sensor, a second air intake flow rate fed into a cylinder of the internal combustion engine at the predetermined timing is obtained by adding the first air intake flow rate to the variance in the air intake flow rate. The second air intake flow rate fed into the cylinder is corrected to a third air intake flow rate required for estimating an actual air intake flow based on an amount of change in a state of a mechanism of the internal combustion engine at the predetermined timing. The mechanism gives an influence on the air intake flow. The air intake flow rate that greatly influences the air intake flow actually fed into the cylinder is calculated at the predetermined timing. This makes it possible to accurately estimate the air intake flow fed into the cylinder.

What is claimed is:

1. An estimation apparatus of an air intake flow for an internal combustion engine comprising:

a pressure sensor that detects an intake pressure in a portion just upstream of an intake valve of an intake system of the internal combustion engine; and an air flow meter that detects an air intake flow rate fed from an upstream side of the intake system to the portion just upstream of the intake valve, wherein:

a first air intake flow rate fed into the portion just upstream of the intake valve at a predetermined timing prior to a timing for starting fuel injection is obtained based on an output of the air flow meter;

a variance in an air intake flow rate caused by a change in the intake pressure in the portion just upstream of the intake valve at the predetermined timing is obtained based on an output of the pressure sensor;

a second air intake flow rate fed into a cylinder of the internal combustion engine at the predetermined timing is obtained by adding the first air intake flow rate to the variance in the air intake flow rate; and the second air intake flow rate fed into the cylinder is corrected to a third air intake flow rate required for estimating an actual air intake flow based on an amount of change in the second air intake flow rate fed into the cylinder at the predetermined timing.

2. The estimation apparatus of an air intake flow for an internal combustion engine according to claim 1, wherein the third air intake flow rate comprises an air intake flow rate in the cylinder at an intake valve closing timing.

3. An estimation apparatus of an air intake flow for an internal combustion engine comprising:

a pressure sensor that detects an intake pressure in a portion just upstream of an intake valve of an intake system of the internal combustion engine; and an air flow meter that detects an air intake flow rate fed from an upstream side of the intake system to the portion just upstream of the intake valve, wherein:

a first air intake flow rate fed into the portion just upstream of the intake valve at a predetermined timing prior to a timing for starting fuel injection is obtained based on an output of the air flow meter;

a variance in an air intake flow rate caused by a change in the intake pressure in the portion just upstream of the intake valve at the predetermined timing is obtained based on an output of the pressure sensor, a second air intake flow rate fed into a cylinder of the internal combustion engine at the predetermined timing is obtained by adding the first air intake flow rate to the variance in the air intake flow rate; and the second air intake flow rate fed into the cylinder is corrected to a third air intake flow rate required for estimating an actual air intake flow based on an amount of change in a state of a mechanism of the internal combustion engine at the predetermined timing, the mechanism giving an influence on the air intake flow.

4. The estimation apparatus of an air intake flow for an internal combustion engine according to claim 3, wherein the third air intake flow rate comprises an air intake flow rate in the cylinder at an intake valve closing timing.

5. The estimation apparatus of an air intake flow for an internal combustion engine according to claim 3, wherein the mechanism of the internal combustion engine comprises at least one of an accelerator pedal, a throttle valve, and a variable valve system that operates the intake valve of the internal combustion engine for controlling the air intake flow.

6. The estimation apparatus of an air intake flow for an internal combustion engine according to claim 3, wherein a state of the mechanism that gives an influence on an actual air intake flow is estimated based on an amount of change in a state of the mechanism at the predetermined timing;

a difference between an air intake flow rate estimated based on the estimated state of the mechanism and an intake air flow rate fed into the cylinder at the predetermined timing, that is estimated based on the estimated state of the mechanism at the predetermined timing is calculated; and the calculated difference is added to the second air intake flow rate so as to be corrected to a third air intake flow rate required for estimating the actual air intake flow such that an air intake flow fed into the cylinder is estimated.

7. The estimation apparatus of an air intake flow for an internal combustion engine according to claim 6, wherein the mechanism of the internal combustion engine comprises at least one of an accelerator pedal, a throttle valve, and a variable valve system that operates the intake valve of the internal combustion engine for controlling the air intake flow.

8. The estimation apparatus of an air intake flow for an internal combustion engine according to claim 6, wherein the air intake flow rate is estimated based on an opening degree of a throttle valve in consideration with an engine speed.

9. The estimation apparatus of an air intake flow for an internal combustion engine according to claim 6, wherein the air intake flow rate is estimated based on a maximum lift amount of the intake valve controlled by the variable valve system in consideration with an engine speed.

10. An estimation method of an air intake flow for an internal combustion engine including a pressure sensor that detects an intake pressure in a portion just upstream of an intake valve of an intake system of the internal combustion engine, and an air flow meter that detects an air intake flow rate fed from an upstream side of the intake system to the portion just upstream of the intake valve, the estimation method comprising:

obtaining a first air intake flow rate fed into the portion just upstream of the intake valve at a predetermined timing prior to a timing for starting fuel injection based on an output of the air flow meter;

obtaining a variance in an air intake flow rate caused by a change in the intake pressure in the portion just upstream of the intake valve at the predetermined timing based on an output of the pressure sensor;

obtaining a second air intake flow rate fed into a cylinder of the internal combustion engine at the predetermined timing by adding the first air intake flow rate to the variance in the air intake flow rate; and correcting the second air intake flow rate fed into the to a third air intake flow rate required for estimating an actual air intake flow based on an amount of change in the second air intake flow rate fed into the cylinder at the predetermined timing.

11. An estimation method of an air intake flow for an internal combustion engine including a pressure sensor that detects an intake pressure in a portion just upstream of an intake valve of an intake system of the internal combustion engine, and an air flow meter that detects an air intake flow rate fed from an upstream side of the intake system to the portion just upstream of the intake valve, the estimation method comprising:

obtaining a first air intake flow rate fed into the portion just upstream of the intake valve at a predetermined timing prior to a timing for starting fuel injection based on an output of the air flow meter;

obtaining a variance in an air intake flow rate caused by a change in the intake pressure in the portion just upstream of the intake valve at the predetermined timing based on an output of the pressure sensor;

obtaining a second air intake flow rate fed into a cylinder of the internal combustion engine at the predetermined timing by adding the first air intake flow rate to the variance in the air intake flow rate; and correcting the second air intake flow rate fed into the cylinder to a third air intake flow rate required for estimating an actual air intake flow based on an amount of change in a state of a mechanism of the internal combustion engine at the predetermined timing, the mechanism giving an influence on the air intake flow.

12. The estimation method of an air intake flow for an internal combustion engine according to claim 11, wherein the mechanism of the internal combustion engine comprises at least one of an accelerator pedal, a throttle valve, and a variable valve system that operates the intake valve of the internal combustion engine for controlling the air intake flow.

13. The estimation method of an air intake flow for an internal combustion engine according to claim 11, wherein a state of the mechanism that gives an influence on an actual air intake flow is estimated based on an amount of change in a state of the mechanism at the predetermined timing;

a difference between an air intake flow rate estimated based on the estimated state of the mechanism and an intake air flow rate fed into the cylinder at the predetermined timing, that is estimated based on the estimated state of the mechanism at the predetermined timing is calculated; and the calculated difference is added to the second air intake flow rate so as to be corrected to a third air intake flow rate required for estimating the actual air intake flow such that an air intake flow fed into the cylinder is estimated.

14. The estimation method of an air intake flow for an internal combustion engine according to claim 13, wherein the mechanism of the internal combustion engine comprises at least one of an accelerator pedal, a throttle valve, and a variable valve system that operates the intake valve of the internal combustion engine for controlling the air intake flow.

15. The estimation method of an air intake flow for an internal combustion engine according to claim 13, wherein the air intake flow rate is estimated based on an opening degree of a throttle valve in consideration with an engine speed.

16. The estimation method of an air intake flow for an internal combustion engine according to claim 13, wherein the air intake flow rate is estimated based on a maximum lift amount of the intake valve controlled by a variable valve system in consideration with an engine speed.

* * * * *